United States Patent [19]

Koerber

[11] Patent Number: 4,783,043
[45] Date of Patent: Nov. 8, 1988

[54] HYDRAULIC SNUB VALVE

[75] Inventor: David J. Koerber, Rockford, Ill.

[73] Assignee: Sundstrand Corporation, Rockford, Ill.

[21] Appl. No.: 46,471

[22] Filed: May 4, 1987

[51] Int. Cl.$^4$ .............................................. G05D 7/01
[52] U.S. Cl. .......................................... 251/16; 91/31; 137/505.13
[58] Field of Search ............................ 137/505.13, 110; 251/16; 91/31

[56] References Cited

U.S. PATENT DOCUMENTS

| 713,788 | 11/1902 | Nethery | 251/16 |
|---|---|---|---|
| 824,425 | 6/1906 | Johnson | 137/505.13 |
| 853,693 | 5/1907 | Healey | 137/505.13 |
| 1,951,065 | 3/1934 | Ryd . | |
| 2,192,042 | 2/1940 | Hoffmann | 137/505.13 X |
| 2,219,408 | 10/1940 | Benz | 137/505.13 X |
| 2,955,614 | 10/1960 | Meynig | 137/505.13 |
| 3,123,094 | 3/1964 | Tosehkoff | 137/505.13 |
| 3,189,045 | 6/1965 | McCloud | 137/505.13 |
| 4,075,928 | 2/1978 | Bitonti | 137/110 X |
| 4,343,328 | 8/1982 | Junger . | |
| 4,436,111 | 3/1984 | Gold et al. | 137/498 |
| 4,465,093 | 8/1984 | Gold et al. | 137/498 |
| 4,655,240 | 4/1987 | Flinchum | 251/16 X |
| 4,694,649 | 9/1987 | Howeth | 137/505.13 X |

Primary Examiner—Robert G. Nilson
Attorney, Agent, or Firm—William D. Lanyi

[57] ABSTRACT

A hydraulic snub valve is provided for use with a source of motive fluid and a device which is to be moved by the motive fluid. The snub valve comprises a piston member which is slidably disposed within a cylinder that has an inlet port and an outlet port. Fluid flow through the inlet port of the present invention can be directed along first and second fluid flow paths. The flow of motive fluid is also directed through an opening in an orifice plate which permits the fluid to cause the piston member to move in a direction towards a position which blocks the first fluid flow path. When the piston member is in such a blocking position, a second fluid flow path is provided through a bypass conduit formed in an extension portion of the piston member. Therefore, the present invention permits a relatively high rate of fluid flow through the valve for a predetermined period of time and a lower rate of fluid flow through the valve after that predetermined period of time has elapsed.

5 Claims, 2 Drawing Sheets

HYDRAULIC SNUB VALVE

BACKGROUND OF THE INVENTION

1. Field of the Invention

The present invention is related generally to snub valves and, more particularly, to a snub valve that provides two alternative fluid flow paths between a source of motive fluid and a device which is moved by the use of hydraulic pressure.

2. Description of the Prior Art

Various types of valve configurations are known to those skilled in the art. Typically, a valve comprises a moving component which can be caused to move, either axially or rotatably, within another component for the purpose of alternatively permitting a fluid to flow through the valve or prohibiting such a flow.

U.S. Pat. No. 1,951,065, which issued to Ryd on Mar. 13, 1934, discloses a pneumatic rock drilling machine that is combined with a change-over valve which is adapted to automatically effect the reversal of the feeding device at a definite point in its movement. It is operated by the driving medium of the machine and may be adapted to throttle the supply of the driving medium to the striking mechanism during the returning movement of the machine.

U.S. Pat. No. 4,650,093, which issued to Gold et al on Aug. 14, 1984, discloses a hydraulic fuse valve that is operable to shut off fluid flow when a fluid conducting line down stream of the fuse has ruptured. The fuse is actuated by two forces which are generated by a pressure differential caused by sudden decompression of the fluid and developed across two variable, sharp edge, viscosity insensitive orifices that are positioned in series and separated by a flow cut-off and sealing surface. The fuse assembly includes a manually adjustable bypass arrangement and a pressure peak attenuating control.

U.S. Pat. No. 4,436,111, which issued to Gold et al, on Mar. 13, 1984, discloses a hydraulic fuse that is used for shutting off the line flow after the flow through the line reaches a certain maximum predetermined value. The spring biased movable closure element of the fuse is actuated by two force generating members positioned in series. The upstream member generates a high actuating force that rapidly increases with the displacement of the movable closure.

U.S. Pat. No. 4,343,328, which issued to Junger on Aug. 10, 1982, discloses a flow sensing check valve that comprises a velocity fuse mounted in the second of two ports. When the velocity fuse senses a preselected difference in flow, it causes a poppet valve to seat.

Copending patent application Ser. No. 46,472, filed on May 4, 1987 by Jones et al and assigned to the assignee of the present application, describes a bi-directional snub valve which performs a function which is similar to the function performed by the present invention. The bi-directional snub valve disclosed in the Jones et al application utilizes two check valves connected in parallel with opposite polarity in association with a piston for the purpose of decreasing fluid flow through a valve as a movable object approaches its end-of-travel position. The check valves cooperate with the piston to slow the movement of the movable object as it reaches its end position but permits the movable object to be moved away from its end of position at full speed.

As described above, many applications in which fluid flowing through an orifice is used as a fuse member to activate or deactivate an operation or component when a predetermined quantity of fluid flows through the orifice are known to those skilled in the art. This concept is generically referred to as a hydraulic fuse and is used to describe the use of an orifice to operate some mechanism after a predetermined quantity of fluid has passed through the orifice from one chamber to another.

SUMMARY OF THE INVENTION

The present invention comprises a valve that provides two fluid flow paths between a source of motive fluid and a device which is to be moved by the motive fluid. In a typical application, the present invention is disposed between a hydraulic pump and a component, such as a door, which is to be moved by hydraulic fluid pressure. The primary function of the present invention is to regulate the flow of fluid from the pump to the movable device in such a way that the initial portion of travel of the movable device is accomplished at a relatively high speed and the last portion of travel of the movable device is accomplished at a lower speed. This type of control is advantageous when it is desired to move the device quickly from a first position to a second position, but it is also desirable to prevent the movable device from moving too rapidly against a stop position. In one particular example, a door may be moved rapidly from a completely opened position to a partially closed position and, by operation of the present invention, the flow of hydraulic fluid is slowed so that the door moves more slowly as it approaches a completely closed position.

To accomplish this function, the present invention comprises a first means for providing a first fluid flow path through the valve between an inlet of the valve and an outlet of the valve. This first fluid flow path is configured to permit a relatively high flow rate of hydraulic fluid between a pump and a movable device, such as a hydraulic piston associated with a door or, alternatively, a flight control surface of an airplane. The present invention also comprises a second means for providing a second fluid flow path through the valve. This second fluid flow path is configured to permit a rate of flow of hydraulic fluid through the valve which is less than the rate of flow provided by the first fluid flow path. This second fluid flow path is also in fluid communication with the inlet and outlet of the valve. The present invention also comprises a means for blocking the first fluid flow path at a predetermined time. For example, after a preselected amount of hydraulic fluid passes through the valve of the present invention, the first fluid flow path is blocked so as to reduce the total flow of hydraulic fluid through the valve. When the first fluid flow path is blocked in this manner, hydraulic fluid is permitted to flow through the second fluid flow path.

In a preferred embodiment of the present invention, a valve is provided with a cylinder and a piston member that is slidably disposed within the cylinder. The valve is also provided with an inlet port and an outlet port connected in fluid communication with each other. The present invention provides a first means for providing a first fluid flow path from the inlet port to the outlet port of the valve when the piston member is disposed in a first portion of the cylinder. It also provides a means for blocking the first fluid flow path between the inlet port and the outlet port when the piston member is disposed in a second portion of the cylinder. In a preferred embodiment of the present invention, the valve is provided with a first means for moving the piston member from the first portion of the cylinder to the second portion of the cylinder and a second means for providing a second fluid flow path from the inlet port of the cylinder to the outlet port of the cylinder when the piston member is disposed in the second portion of the cylinder to block the first fluid flow path. In a preferred embodiment of the present invention, the cylinder is provided with a first end wall disposed at a first end of the cylinder and a second end wall disposed at a second end of the cylinder with a piston member being slidably disposed in the cylinder between the first and second end walls. The second end wall is provided with a first opening that is shaped to permit an extension portion of the piston member to extend therethrough. This first opening is connected in fluid communication with an outlet port of the valve and in fluid communication with an inlet port of the valve when the piston member is in a non-contact relation with the second end wall of the cylinder. This first opening is configured to permit a fluid to flow from the inlet port of the cylinder to the outlet port of the cylinder when the piston member is in non-contact relation with the second end wall. The piston member of the present invention is shaped to prevent a fluid flow through the first opening when the piston member is in contact relation with the second end wall of the cylinder. A second opening is provided in the first end wall of the cylinder. This second opening is connected in fluid communication with the inlet port of the valve and permits a fluid to flow from the inlet port of the valve into the cylinder. This second opening is also arranged in relation with the piston member in such a way so as to cause the piston member to move away from the first end wall and toward the second end wall in response to fluid flowing from the inlet port, through the second opening, and into the cylinder. In a preferred embodiment of the present invention, a bypass conduit is formed in the piston member and the bypass conduit is connected in fluid communication with the inlet port and the outlet port of the valve. The bypass conduit extends through the extension portion of the piston member and is configured to provide a fluid flow path between the inlet port and the outlet port of the valve when the piston member is disposed in contact relation with the second end wall of the cylinder.

In a preferred embodiment of the present invention, the piston member is provided with a means for urging it in a direction away from the second end wall and toward the first end wall of the cylinder. In one embodiment of the present invention, this urging means comprises a spring which acts in a direction opposite to that of the movement of the piston member in response to fluid flowing from the inlet port of the valve into the cylinder through the second opening.

In operation, a preferred embodiment of the present invention causes motive fluid to flow through the first opening into the second end wall of the cylinder simultaneous with a flow of motive fluid through the second opening in the cylinder. After a predetermined length of time, the flow of motive fluid through the second opening in the cylinder causes the piston member to move away from the first end wall and towards the second end wall and, eventually, into contact relation with the second end wall. When the piston member moves into contact relation with the second end wall of the cylinder, the flow of fluid through the first opening in the second end wall of the cylinder is blocked. After the piston member blocks the first fluid flow path in the manner described above, a second fluid flow path is provided by the bypass conduit formed in the extension portion of the piston member. Therefore, the present invention permits an initially high rate of fluid flow through the valve until a predetermined period of time elapses from the beginning of fluid flow through the valve. After that period of time elapses, the flow is reduced to that amount which is permitted to flow through the bypass conduit. A device that is being moved by the flow of motive fluid through the valve is initially caused to move at a relatively high rate of speed because of the high fluid flow rate through the valve, and, subsequently, is caused to move at a slower rate of speed when the first fluid flow path is blocked and the flow through the valve is limited to that quantity of flow that is permitted through the bypass conduit.

In an alternative embodiment, the present invention is provided with a means for continuously reducing the rate of flow through the present invention as the piston member approaches the second wall. In other words, the flow is gradually reduced even before the piston member moves into contact relation with the second end wall. In comparison with the preferred embodiment of the present invention which permits the full rate of flow until the piston member moves into contact relation with the second end wall, the alternative embodiment of the present invention initially permits a full flow of fluid through the valve when the piston member is proximate the first end wall and, as the piston member moves away from the first end wall toward the second end wall, the flow is continually reduced until the piston member moves into contact relation with the second end wall. After the piston member moves into contact with the second end wall, the reduced amount of fluid flow permitted through the bypass conduit of the piston member is essentially the same as in the preferred embodiment of the present invention.

In both embodiments of the present invention, it should be understood that a means is provided for returning the piston member to its initial position proximate the first end wall when the movable device is moved into a position against its stops. In other words, when the present invention is used in conjunction with a door, the present invention provides a means for moving the piston back into its position against the first end wall when the door has been completely closed. In a preferred embodiment of the present invention, a spring is used to force the piston member back to its initial position when motive fluid is no longer pumped through the valve of the present invention.

The present invention therefore provides a valve which initially permits a relatively high rate of fluid flow through it and then, after a predetermined length of time, limits the fluid flow through the valve to a lessor flow rate. This type of valve is advantageous when it is desirable to move an object, such as a door or a flight control surface, initially at a high rate of speed and then at a lower rate of speed.

BRIEF DESCRIPTION OF DRAWINGS

The present invention will be more clearly understood by reading the description of the preferred embodiment in conjunction with the drawing, in which.

DESCRIPTION OF THE PREFERRED EMBODIMENT

Figure 1:
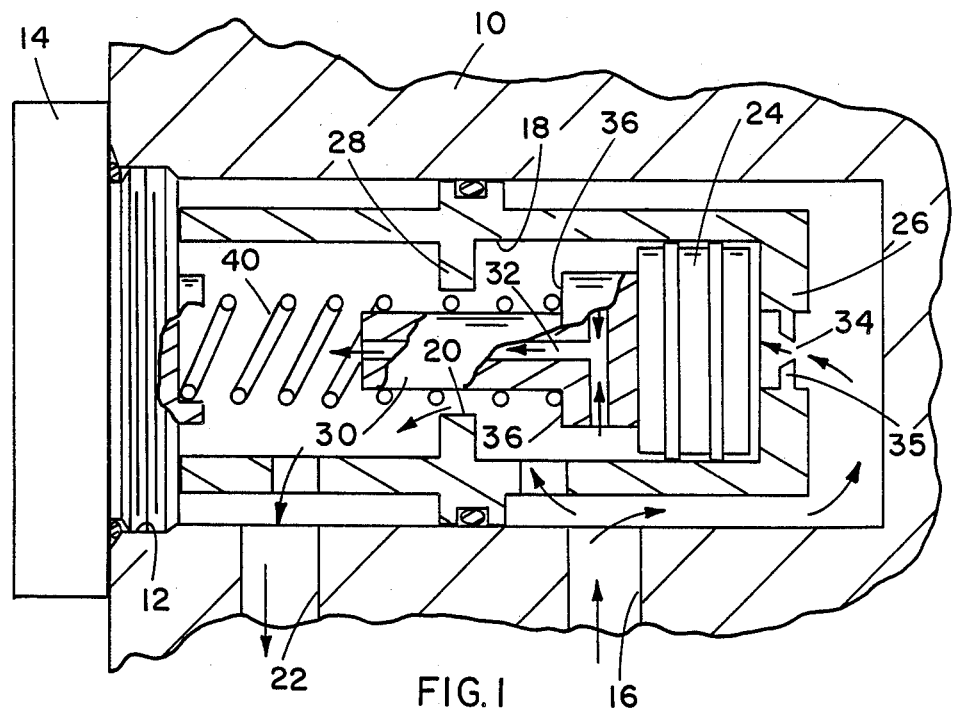
FIG. 1 illustrates the present invention with its piston member disposed in a non-blocking relation with a first fluid flow path.

FIG. 1 illustrates the present invention in a configuration which permits a first fluid flow path through the valve. As shown in FIG. 1, the present invention provides a housing 10 in which the operative portions of the present invention are contained. The housing 10 contains an opening 12 with a plug member 14 provided to contain the present invention within the housing 10. An inlet port 16 permits a fluid flow to enter the valve of the present invention. As can be seen in FIG. 1, a motive fluid entering the inlet port 16 can flow into the cylinder 18 and through a first opening 20. After the motive fluid flows through the first opening 20 in a direction illustrated by the arrows, it can then flow out of the valve through an outlet port 22. When the piston member 24 is disposed within the cylinder 18 in the configuration shown in FIG. 1, a first fluid flow path is provided through the first opening 20 for fluid flowing from the inlet port 16 to the outlet port 22.

As can be seen in FIG. 1, the cylinder 18 is provided with a first end wall 26 and a second end wall 28. The first opening 20 is formed in the second end wall 28 to provide the first fluid flow path described above. An extension portion 30 of the piston member 24 is shaped to extend through the first opening 20 in the second end wall 28. As can also be seen in FIG. 1, a bypass conduit 32 is provided through the extension portion 30 of the piston member 24 for the purpose of providing a second fluid flow path between the inlet port 16 and the outlet port 22 of the present invention. As motive fluid passes from the inlet port 16 into the valve of the present invention, it can also pass through a second opening 34 in the first end wall 26 of the cylinder 18. As the fluid passes from the inlet port 16 through the second opening 34, it enters the cylinder 18 at a position between the piston member 24 and the first end wall 26 of the cylinder. This movement of fluid into the cylinder causes the piston member 24 to move away from the first end wall 26 of the cylinder and towards the second end wall 28 of the cylinder.

Figure 2:
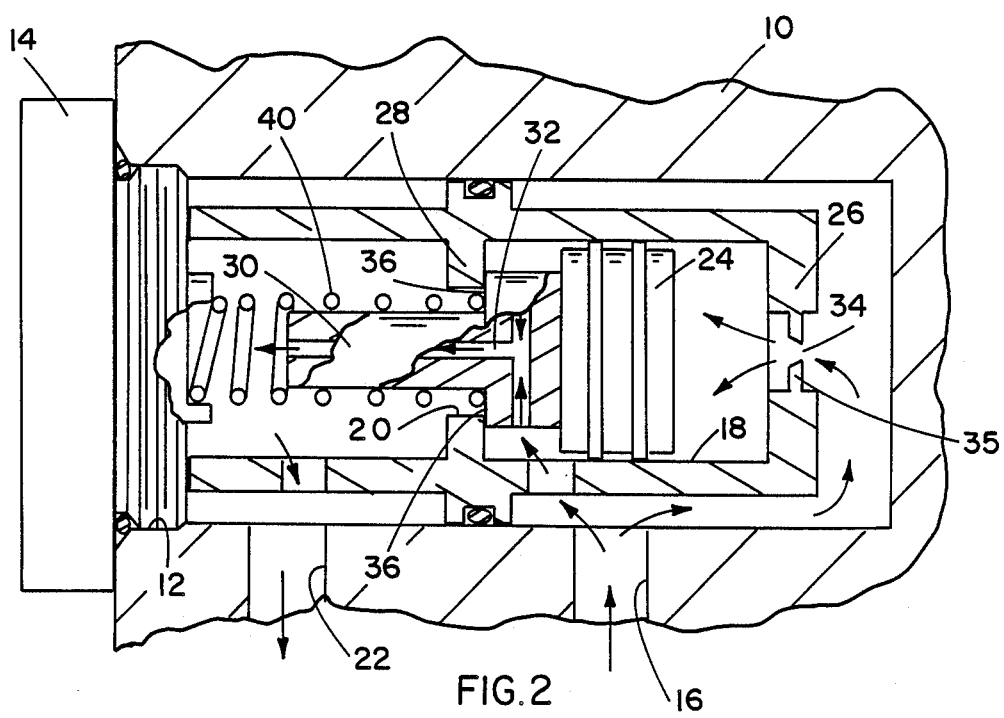
FIG. 2 illustrates the present invention with its piston member in a blocking relation with the first fluid flow path.

As described above, the second opening 34 is provided through the first end wall 26 for the purpose of permitting the motive fluid to flow from the inlet port 16 into the cylinder 18 to cause the piston member 24 to move away from the first end wall 26 and towards the second end wall 28 of the cylinder. In a preferred embodiment of the present invention, the second opening 34 is provided as an opening through an orifice plate 35. The second opening 34 in the orifice plate 35 is sized in such a way so as to cause the piston member 24 to move away from the first end of the cylinder, at the position shown in FIG. 1, and toward the second end wall 28 of the cylinder in a predetermined amount of time. Therefore, it should be understood that the size of the second opening 34 in the orifice plate 35 is selected as a function of the pressure of the motive fluid entering the inlet port 16, the sizes of the alternative flow paths and the desired time for the piston member 24 to complete its travel from the position shown in FIG. 1, proximate the first end wall 26, to its position in contact relation with the second end wall 28 as shown in FIG. 2 which is described in greater detail below. In the preferred embodiment of the present invention, the size of the first opening 20 in relation to the size of the extension portion 30 of the piston member 24 must be considered along with the size of the bypass conduit 32 and the force provided by the spring 40. The use of this technique, such as the second opening 34 in the orifice plate 35 to move the piston member 24 in response to a flow of fluid through the inlet port 16, is generally known to those skilled in the art and is referred to as a hydraulic fuse.

As will be described in more detail below in conjunction with FIG. 2, it should be apparent from the configuration shown in FIG. 1 that, as the piston member 24 moves away from the first end wall 26 toward the second wall 28, a blocking portion 36 of the piston member 24 will eventually move into contact relation with the second end wall 28 of the cylinder. When the piston member 24 moves into contact relation with the second end wall 28, the blocking portion 36 of the piston member 24 will prevent fluid from flowing through the first opening 20 between the inlet port 16 and the outlet port 22 of the present invention. When this blocking of the first fluid flow path is accomplished, fluid can continue to flow through the bypass conduit 32 that is formed in the extension portion 30 of the piston member 24. However, it should be understood that the rate of fluid flow through the bypass conduit 32 is less than that rate of flow permitted through the first opening 20. Therefore, when the piston member 24 moves into contact relation with the second end wall 28, the rate of fluid flow from the inlet port 16 to the outlet port 22 is reduced, but not completely stopped. As can be seen in FIG. 1, the force provided by the motive fluid flowing through the second opening 34 is resisted by a spring 40. The spring 40 provides a means for urging the piston member 24 in a direction away from the second end wall 28 and towards the first end wall 26. The spring 40 is sized to urge the piston member 24 in this direction when the pressure of the motive fluid entering the inlet port 16 is less than that required to cause the motion of the piston member 24 in a direction away from the first end wall 26 as described above.

The force provided by spring 40 in a direction toward the right in FIG. 1, operates to return the piston member 24 away from the second end wall 28 and toward the first end wall 26. Therefore, when motive fluid pressure is removed from the inlet 16, the force provided by the spring 40 will tend to move the piston member 24 toward the right in FIG. 1 and, as a result, cause the fluid to flow out of the cylinder 18 and through the orifice 34 in a direction toward the right in FIG. 1. This movement will occur when the source of motive fluid, such as a pump, is deactivated. When the inlet port 16 is deprived of a flow of motive fluid, the spring 40 causes the present invention to return to the position shown in FIG. 1. Therefore, when deactivated, the present invention is returned to its initial position by the action of the spring 40. With no fluid flowing in either direction through the inlet port 16, the fluid that is forced out of the cylinder 18 through the orifice 34 will travel in a direction opposite to that shown by the arrows in FIG. 1 and will eventually flow into the cylinder 18 toward the left of the piston member 24. Since there is no net flow of fluid into or out of the present invention during periods of deactivation, the fluid that is removed from the cylinder between the piston member 24 and the first end wall 26 will eventually flow into the cylinder 18 between the piston member 24 and the second end wall 28. However, it should be understood that no net flow of fluid into or out of the present invention will generally occur during periods of deactivation when the spring 40 is moving the piston member 24 to its initial position shown in FIG. 1.

FIG. 2 illustrates the present invention with its piston member 24 disposed in contact relation with the second end wall 28. In FIG. 2, the piston member 24 has been moved away from the first end wall 26 by the flow of motive fluid through the second opening 34 and into the cylinder 18 between the piston member 24 and the first end wall 26 of the cylinder. When the piston member 24 is thus moved into contact relation with the second end wall 28, the first opening 20 is blocked and the flow of motive fluid along the first fluid flow path is prevented. Therefore, with the piston member 24 and the position shown in FIG. 2, no motive fluid is permitted to flow from the inlet port 16 through the first opening 20 and the second end wall 28 of the cylinder. However, as described above and illustrated in FIG. 2, motive fluid is permitted to flow through the bypass conduit 32 that is formed in the extension portion 30 of the piston member 24. This bypass conduit 32 therefore permits a flow of fluid from the inlet port 16 to the outlet port 22 in such a way so as to bypass the blocking means which comprises a combination of the blocking portion 36 of the piston member 24 and the second end wall 28 of the cylinder 18. It should be understood that, as described herein, the first opening 20 is blocked by the blocking portion 36 of the piston member 24 when the piston member 24 is moved into contact relation with the second end wall 28. This terminology is used to describe the situation in which fluid is prevented from flowing from the inlet port 16 through the first opening 20 around the extension portion 30 of the piston member 24. It is realized that the bypass conduit 32 actually permits fluid to flow through the first opening 20 even when the blocking portion 36 of the piston member 24 is in contact relation with the second end wall 28. However, when the first opening 20 is referred to herein as being blocked by the blocking portion 36 of the piston member 24, it is the portion of opening 20 surrounding the extension portion 30 of the piston member 24 that is being referred to as being blocked even though it is understood that the bypass conduit 32 extends through the first opening and permits a fluid flow through the first opening even when the piston member 24 is in contact relation with the second end wall 28.

The present invention is intended for application between a source of motive fluid, such as a hydraulic pump, and a movable object, such as a hydraulic cylinder associated with a device which is intended to be moved as a result of fluid pressure. As described above, a specific application of the present invention could be used in conjunction with a hydraulic pump and a piston associated with a door or any other object which is intended to be moved initially at a relatively high rate of speed and, subsequently, at a slower rate of speed as the movable object approaches its end of travel position. As an example, if the present invention is used in conjunction with a door closing mechanism, the door can be moved at a relatively rapid rate of speed from its completely opened position to a position where the door remains partially opened. From the partially opened position to a completely closed position, the rate of movement is reduced to a slower speed. However, even during the slower movement of the door, it experiences a positive force to assure the final movement of the door into a completely closed position.

Figure 3:
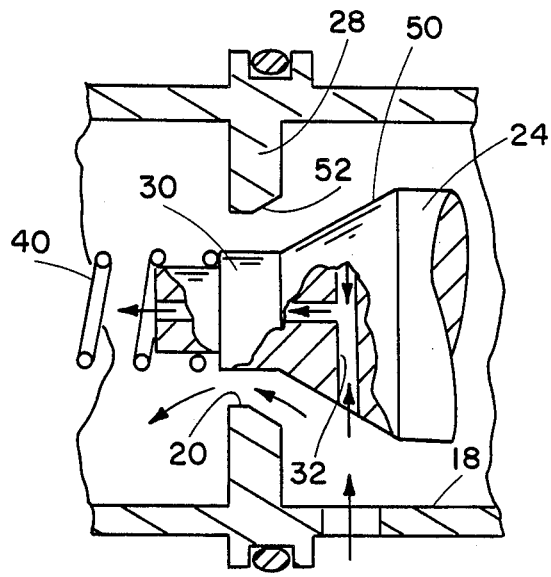
FIG. 3 shows an alternative embodiment of the present invention which provides for a continuously reduced rate of fluid flow as the piston member approaches the second end wall.

FIG. 3 illustrates an alternative embodiment of the present invention. It should be understood that FIG. 3 shows a sectional view of a portion of the valve illustrated in FIGS. 1 and 2. In this alternative embodiment of the present invention, the piston member 24 is provided with an extension portion 30 as discussed above, but with an additional transition portion 50 extending between the main body of the piston member 24 and the portion of the piston member which extends through the opening 20. As shown in FIG. 3, this alternative embodiment of the present invention is similar in many ways to the embodiment described above. The piston member 24 is disposed in slidable relation within a cylinder 18. Although not shown in FIG. 3, it should be understood that the largest portion of the piston member 24 is provided with a means for providing a seal between it and the inner surface of the cylinder 18. That portion of the piston member 24 is essentially similar to the embodiments shown in FIGS. 1 and 2. Besides the tapered transition portion 50, the embodiment shown in FIG. 3 also provides a tapered portion 52 to the opening 20. It should be understood that as the piston member 24 moves from the right toward the left in FIG. 3, the effective opening of the first opening 20 is continuously reduced from a full flow position, as shown in FIG. 3, to a completely blocked position when the transition surface 50 moves into contact relation with the tapered portion 52 of the first opening 20. When the transition portion 50 moves into blocking relation with the first opening 20 and into contact relation with the tapered portion 52 of the first opening 20, the first fluid flow path is blocked and the second fluid flow path, through the bypass conduit 32, permits a reduced amount of fluid flow to continue. It should be understood that the primary distinction between the alternative embodiment shown in FIG. 3 and the preferred embodiment shown in FIGS. 1 and 2 relates to the fact that the first fluid flow path in the alternative embodiment if continuously reduced as the relationship between the piston member 24 and the first opening 20 gradually changes from a fully opened arrangement to a fully closed arrangement. In comparison to FIGS. 1 and 2, the first fluid flow path provided by the alternative embodiment does not suddenly change from a fully opened configuration to a fully closed configuration. Instead, the flow is gradually reduced from a full flow condition to a low flow condition at which time the only flow permitted is through the secondary flow path through the bypass conduit 32. The other portions of the alternative embodiment are similar to those shown in FIGS. 1 and 2 and described above.

Figure 4:
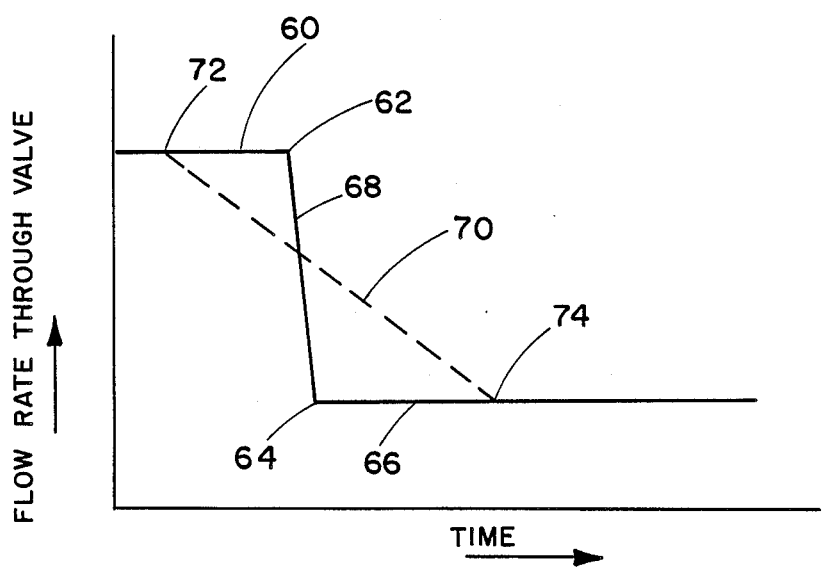
FIG. 4 shows a graphical illustration of the relationship of flow through the present invention and elapsed time.

FIG. 4 is a graphical representation of the flow rate through the present invention as a function of time for both embodiments of the present invention. Line 60 represents a flow rate that exists when the piston member 24 is at its right-most position in FIGS. 1, 2 and 3. In other words, when the piston member 24 is disposed proximate the first end wall 26, the rate of flow through the present invention is at its maximum level. This flow continues until the movement of the piston member 24 is sufficient to effect the flow through the first opening 20 around the extension portion 30 of the piston member 24. The solid horizontal line 60 in FIG. 4 represents this rate of flow. In the preferred embodiment of the present invention, illustrated in FIGS. 1 and 2, and described above, the flow rate changes at point 62 and rapidly decreases to point 64 to a lower flow rate, represented by line 66, that indicates the rate of flow permitted through the bypass conduit 32 that extends through the extension portion of the piston member 24. As indicated by line 68, the rate of change from the full flow condition indicated by line 60 to the reduced flow condition illustrated by line 66 is relatively rapid. The change in the flow rate represented by line 68 occurs during the time when the blocking portion 36 of the piston member 24 is in closed proximity with the second end wall 28 but still in non-contact relation therewith. Point 62 in FIG. 3 represents the point in time when the blocking portion 36 of the piston member 24 is close enough to the second end wall 28 to begin to effect the rate of flow through the first opening 20 but far enough away from the second end wall 28 to avoid a complete blocking of the first opening 20. As can be seen in FIG. 4, the rate of change represented by line 68 is relatively sudden because of the geometric shapes of the blocking portion 36 and the second end wall 28. However, it is recognized that line 68 is not vertical because a finite amount of time is required for the blocking portion 36 of the piston member 24 to move from a closely proximate position in relation to the second end wall 28 to a position in which the blocking portion 36 is in contact relation with the second end wall 28.

The dashed line 70 in FIG. 4 represents the more gradual transition from a full flow rate to a reduced flow rate that results from the use of the alternative embodiment of the present invention that is shown in FIG. 3. At some period of time following the initiation of fluid flow through the inlet port 16 of the present invention, the piston member 24 begins to move away from the first end wall 26 and toward the second end wall 28. At some point in time, indicated by reference numeral 72 in FIG. 4, the tapered transition portion 50 of the piston member 24 begins to move into the first opening 20. As the tapered transition portion 50 moves toward the tapered portion 52 of the first opening 20, it begins to reduce the effective area of the first opening 20 surrounding the extension portion 30 of the piston member 24. As this occurs, the flow of fluid through the first opening 20 is gradually reduced as the piston member 24 moves toward the left in FIG. 3. This reduced rate of flow through the first opening 20 and around the extension portion 30 is illustrated by the dashed line 70 in FIG. 4. The flow is continually reduced as the piston member 24 moves towards the left in FIG. 3 until, at point 74, all flow through the first opening 20 and around the extension portion 30 is blocked. Point 74 in FIG. 4 represents the time when the tapered transition portion 50 of the piston member 24 moves into contact relation with the tapered portion 52 of the first opening 20. At this point in time, the fluid is reduced to that quantity which is permitted to flow through the bypass conduit 32 formed in the piston member 24.

In FIG. 4, the primary differences between the preferred embodiment of the present invention and the alternative embodiment of the present invention can be appreciated by observing the difference between lines 68 and 70. In the preferred embodiment of the present invention, as illustrated in FIGS. 1 and 2, a relatively steep transition occurs between the full rate of flow represented by line 60 and the reduced rate of flow represented by line 68. It should be understood that the transition line 68 represents the change in flow rate that occurs from the time when the blocking portion 36 of the piston member 24 is in proximate non-contact relation with the end wall 28 and the point in time when the blocking portion 36 is in actual contact relation with the second end wall 28. The dashed line 70 represents the more gradual transition between the full flow condition represented by line 60 and the reduced flow condition represented by line 66. This continuous reduction in flow rate begins when the tapered transition portion 50 of the piston member 24 begins to move into the first opening 20 at point 72 in FIG. 4. It continues until, as represented by line 74, the tapered transition portion 50 of the piston member 24 moves into contact relation with the tapered portion 52 of the first opening 20. Depending on the particular application in which the present invention is used, either the preferred embodiment or the alternative embodiment may be preferable. The preferred embodiment of the present invention will permit the higher flow rate for a longer period of time and then, when the blocking portion of the piston member moves into contact relation with the second end wall, a reduced flow rate. This preferred embodiment could be indicated for use when the overall time of actuation is to be minimized. In other words, it will move the movable object at its maximum rate until the preselected time when the lower flow rate is desired. By comparison, the alternative embodiment of the present invention will reduce the rate of flow from its maximum rate to a continuously decreasing rate over a longer transition period until, eventually, the lower flow rate is caused by the contact relation between the piston member and the second end wall.

In application, the present invention is connected between, and in series with, a source of motive fluid and the movable object. For example, as shown in FIGS. 1, 2, and 3 the present invention would be connected with its inlet port being in fluid communication with the source of motive fluid, such as a hydraulic pump, and its outlet port connected in fluid communication with a device which is to be moved, such as a hydraulic piston associated with a door or flight control surface.

Although the present invention has been described with particular specificity in conjunction with one preferred embodiment, other embodiments can be provided within the scope of the present invention.

What I claim is:
1. A valve, comprising:
a piston member slidably disposed in a cylinder, said cylinder having a first end and a second end;
an inlet port of said valve;
an outlet port of said valve;
first means for providing a first flow path from said inlet port to said outlet port, said first flow path extending through said second end of said cylinder;
second means for providing a second flow path from said inlet port to said outlet port, said second flow path extending through said piston member;
third means for providing a third flow path from said inlet port to said first end of said cylinder, said third flow path extending through an opening in an orifice plate disposed at said first end of said cylinder, said piston member being configured to be movable in a direction away from said first end of said cylinder toward said second end of said cylinder in a predetermined length of time in response to a flow of fluid from said inlet into said cylinder through said opening in said orifice plate, said predetermined length of time being a function of an amount of fluid flow through said valve subsequent to a beginning of fluid flow along said first flow path; and means for blocking said first flow path, said second flow path being configured to bypass said blocking means.

2. The valve of claim 1, wherein:

said blocking means comprises a portion of said piston member and a portion of said second end of said cylinder.

3. A valve, comprising:

a cylinder having a first end wall disposed at a first end of said cylinder and a second end wall disposed at a second end of said cylinder;

a piston member slidably disposed in said cylinder;

a first opening in said second end wall at said second end of said cylinder, said first opening being shaped to permit an extension portion of said piston member to extend therethrough, said first opening being in fluid communication with an outlet port of said valve, said first opening being in fluid communication with an inlet port of said valve when said piston member is in non-contact relation with said end wall at said second end of said cylinder, said first opening being configured to permit fluid flow from said inlet port to said outlet port when said piston member is in non-contact relation with said second end wall at said second end of said cylinder, said piston member being shaped to prevent fluid flow through said first opening when said piston member is in contact relation with said second end wall at said second end of said cylinder;

a second opening in a first end wall of said first end of said cylinder, said second opening being in fluid communication with said inlet port of said valve, said second opening being configured to permit fluid to flow from said inlet port into said cylinder through said second opening, said second opening being arranged in relation with said piston member to permit said piston member to move away from said first end wall at said first end of said cylinder and toward said second end wall at said second end of said cylinder in response to fluid flowing from said inlet port into said cylinder through said second opening, said second opening comprising a hole in an orifice plate, said hole in said orifice plate being configured to permit said piston member to move from said first end wall at said first end of said cylinder to said second end wall at said second end of said cylinder in response to a predetermined amount of fluid flowing through said inlet port; and a bypass conduit formed in said piston member, said bypass conduit being in fluid communication with said inlet port and said outlet port, said bypass conduit extending through said extension portion of said piston member, said bypass conduit being configured to provide a fluid flow path between said inlet port and said outlet port when said piston member is disposed in contact relation with said second end wall at said second end of said cylinder.

4. The valve of claim 3, further comprising:

means for urging said piston member in a direction away from said second end wall at said second end of said cylinder and toward said first end wall at said first end of said cylinder.

5. The valve of claim 4, wherein:

said urging means comprises a spring.

* * * * *